(12) United States Patent
Bellinger et al.

(10) Patent No.: US 7,134,013 B2
(45) Date of Patent: Nov. 7, 2006

(54) POLICY DISTRIBUTION POINT FOR SETTING UP NETWORK-BASED SERVICES

(75) Inventors: Douglas Bellinger, Ottawa (CA); Richard Burke, Vanier (CA); Thomas Phillips, Ottawa (CA); Antonino Scaffidi Argentina, Gloucester (CA); Andrea Baptiste, Ottawa (CA); Gaetan Delahousse, Ottawa (CA); Geoff Stewart, Ottawa (CA); Wendy Raoux, Ottawa (CA); Luc Richard, Greely (CA); Stephanie Bazin, Ottawa (CA); Scott Brookes, Ottawa (CA); Patrick Rhude, Dunrobin (CA)

(73) Assignee: Atreus Systems Corp., Ottawa (CA)

( * ) Notice: Subject to any disclaimer, the term of this patent is extended or adjusted under 35 U.S.C. 154(b) by 819 days.

(21) Appl. No.: 10/223,846

(22) Filed: Aug. 19, 2002

(65) Prior Publication Data
US 2003/0149894 A1    Aug. 7, 2003

Related U.S. Application Data

(60) Provisional application No. 60/354,268, filed on Feb. 4, 2002.

(51) Int. Cl.
*H04L 29/12* (2006.01)
*H04L 29/02* (2006.01)
(52) U.S. Cl. .................. 713/153; 713/154; 713/163
(58) Field of Classification Search ..................... None
See application file for complete search history.

(56) References Cited

U.S. PATENT DOCUMENTS 5,692,111 A * 11/1997 Marbry et al. ............. 358/1.15
6,263,387 B1 * 7/2001 Chrabaszcz ................. 710/302

(Continued)

FOREIGN PATENT DOCUMENTS

EP    1265414 A1 * 12/2002

OTHER PUBLICATIONS

Gagnon, Francois et al."Implementation of Delegation in Distributed Network Administration." IEEE(1993):1229-1233.*

(Continued)

*Primary Examiner*—Gilberto Barrón, Jr.
*Assistant Examiner*—Venkat Perungavoor
(74) *Attorney, Agent, or Firm*—Imperium Patent Works; Darien K. Wallace; T. Lester Wallace

(57) ABSTRACT

A "policy distribution point" (PDP) allows service drivers to be installed remotely and automatically without rebooting the PDP or otherwise interrupting existing network-based services. The exposure of sensitive configuration data to non-secure networks is minimized by placing PDPs close to the devices to be configured. Service drivers on the PDP can be reused to configure multiple devices of the same type. The PDP receives an "activation" and uses a service driver on the PDP to translate the activation into "device-specific instructions." The device-specific instructions are sent to a device and configure the device to set up the network-based service. One or more PDPs can be used to configure both computing device and networking devices to provide a single service.

20 Claims, 9 Drawing Sheets

U.S. PATENT DOCUMENTS

| | | | |
|---|---|---|---|
| 6,772,420 B1* | 8/2004 | Poger et al. | 719/327 |
| 6,961,567 B1* | 11/2005 | Kuhn | 455/435.1 |
| 6,976,252 B1* | 12/2005 | White et al. | 717/174 |
| 2002/0083431 A1* | 6/2002 | Machida | 717/174 |
| 2002/0161939 A1* | 10/2002 | Kim et al. | 710/8 |
| 2002/0198969 A1* | 12/2002 | Engel et al. | 709/220 |
| 2003/0045316 A1* | 3/2003 | Tjong et al. | 455/517 |
| 2003/0084132 A1* | 5/2003 | Ohta | 709/221 |
| 2003/0088711 A1* | 5/2003 | Tabares et al. | 709/321 |

OTHER PUBLICATIONS

Verma, Dinesh et al. "Policy-Based Management of Content Distribution Networks". IEEE(2002):34-39.*

* cited by examiner

POLICY DISTRIBUTION POINT FOR SETTING UP NETWORK-BASED SERVICES

CROSS REFERENCE TO RELATED APPLICATION

This application claims the benefit under 35 U.S.C. §119 of the provisional application Ser. No. 60/354,268, entitled "Software Platform For Managing Network-Based Services", by Bellinger et al., filed Feb. 4, 2002 (the subject matter of which is incorporated herein by reference).

This application also claims the benefit under 35 U.S.C. §120 of patent application Ser. No. 10/213,043, entitled "System And Method For Setting Up User Self-Activating Network-Based Services", by Bellinger et al., filed Aug. 5, 2002, now U.S. Pat. No. 7,024,470 (the subject matter of which is incorporated herein by reference).

TECHNICAL FIELD

The present invention relates to setting up network-based services, and more particularly to a policy distribution point and service drivers used to configure devices that will be used to provide the network-based services.

The Compact Disc Appendix, which is a part of the present disclosure, includes one recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

Network-based services are often provided over networks, such as the internet, the network of a public telephone company, or a company's own private telecommunications network. Such a network-based service may involve the use of multiple hardware devices and/or multiple software applications. Before the service is operable, however, the multiple hardware devices and/or multiple software applications used by the service must generally be configured.

To configure a hardware device, a skilled technician may use a remote device coupled to the hardware device to be configured. The technician shuts down the remote device, installs a software service driver on the remote device, and then restarts the remote device. Once the service driver is installed, configuration information is sent through the service driver to the hardware device, thereby configuring the hardware device so that the hardware device can operate to carry out the service. This manner of setting up a network-based service by loading a service driver can be a relatively time-intensive, manual task.

Not only can this setting up of a network-based service for the first user be time consuming, but the setting up of the same service for subsequent users can also be time consuming. To set up the service for a second user, the hardware devices involved in supplying that service to the second user will need to be configured. As in the case of setting up the service for the first user, a technician may load a second service driver onto a remote device. Once the second service driver is installed on the remote device, configuration information is sent through the second service driver and to the hardware device being configured.

If the remote device used to set up the service for the second user is already operating at the location of the second user in the field, then the technician need not go to the location of the second user and install the remote device before the second service driver can be installed. Rather, the technician can remotely install the second service driver on the existing remote device. Even in the case where the remote device is already installed, however, the technician still handles loading a service driver onto a remote device each time a device is configured to provide the service to a new user.

Not only is the need for the technician to install service drivers undesirable, but the conventional installing of service drivers is also undesirable in that service may be interrupted to exiting services and/or users. To install a service driver on a remote device, the remote device is typically shut down, the service driver software added, and the remote device is rebooted. The installation of service drivers may therefore cause service interruption to other existing services that use the remote devices.

Accordingly, the above-described setting up of network-based services generally involves a technician being involved every time a service is provided to a user. This is undesirable. Moreover, the setting up of services for new users often results in service interruption to existing users. This is undesirable. A system is sought that eliminates the cost, time, complexity and service interruption associated with setting up such network-based services.

SUMMARY

To set up a network-based service for a first user, one or more devices involved in carrying out the service are configured. These devices can include networking devices and/or computing devices. To configure a device, a "policy distribution point" (PDP) is identified that is located in close proximity to the device to be configured. The policy distribution point may, for example, be embodied in a hardware device located in the field in close proximity to the device to be configured. Once the PDP is identified, a suitable "service driver" is installed on the PDP so that the PDP can communicate with the device. If a suitable service driver has already been installed on the PDP, then the service driver does not need to be reinstalled. It is merely reused.

If, however, a suitable service driver is not already installed on the PDP, then the service driver may be sent to the running PDP across the network. The service driver is installed on the PDP automatically without rebooting the PDP and without disturbing the operation of any other service drivers that may be installed on the PDP.

Once the required service driver is installed on the PDP, an "activation" is sent to the running PDP. The activation in one example is in XML format and includes both a configuration parameter related to the network-based service as well as a configuration parameter related to the first user. The service driver in the PDP translates the activation into device-specific instructions that are sent from the PDP to the device being configured. The device-specific instructions are instructions understood by the device to be configured. When received, the device-specific instructions configure the device so as to set up the service for the first user.

In accordance with a second embodiment of the present invention, there is also a second device that needs to be configured to set up the service for the first user. A PDP associated with this second device is identified. In the manner set forth above, a suitable service driver is installed on the second PDP. A second activation is then sent to the second PDP such that the service driver in the second PDP translates the second activation into device-specific instructions for the second device. The device-specific instructions are sent from the second PDP to the second device thereby configuring the second device. Network-based services involving both computing devices and/or networking devices can be set up in this way.

In accordance with a third embodiment of the present invention, the running PDP used to set up a service for the first user is also used to set up a service for a second user. The running PDP receives a third activation. The third activation contains another configuration parameter related to the network-based service and another configuration parameter related to a second user. The service driver already installed on the PDP for the first user then translates the third activation into third device-specific instructions. The third device-specific instructions are sent to the first device so as to set up the service for the second user. Accordingly, the same service driver that is used to set up the network-based service for the first user is also used to set up the network-based service for the second user.

In accordance with some embodiments, the PDP is not a monolithic block of code, but rather involves modular blocks of code. These blocks of code include a service driver infrastructure portion and one or more service drivers. The service drivers couple to and interact with the infrastructure via a predefined interface. This predefined interface facilitates the installation of service drivers onto the PDP at run time without disturbing the operation of other software running on the PDP, including previously installed service drivers. Service drivers are installed automatically and remotely without any action by technicians or service personnel. Once installed, the service drivers automatically translate activations as necessary to generate and send device-specific instructions to the devices to be configured.

In one novel aspect, a PDP is disposed in proximity to the device to be configured such that sensitive information in the device-specific instructions does not pass over the internet. A PDP may, for example, be disposed in a company building where the user to be supplied with the network-based service is a company employee who works in the building. The PDP and the device to be configured communicate via a secure company network within the building. By locating both the PDP and the device to be configured on the secure company network, the device-specific instructions are communicated from the PDP to the device via the secure network without sending the sensitive information in the device-specific instructions out over the internet.

Other embodiments are also disclosed in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
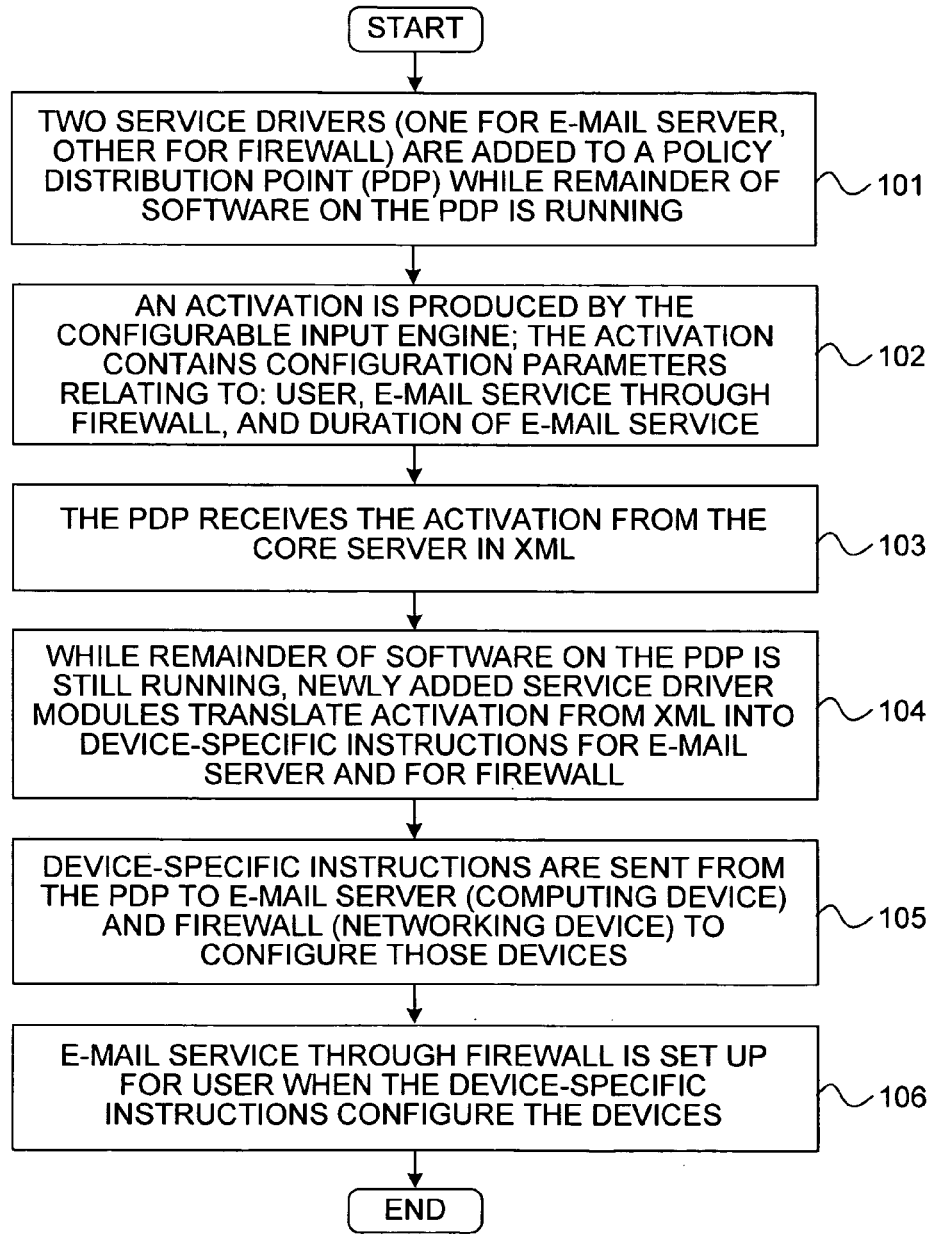
FIG. 1 is a flowchart of a method of configuring devices in order to set up e-mail service.

FIG. 1 is a flowchart of a method of configuring devices in a first embodiment of the present invention in order to set up e-mail service. An internet service provider (ISP) or a public telephone carrier provides a user with a network-based service, such as e-mail service. The user accesses e-mail through his computer, which is located on a local area network (LAN). E-mail messages must pass through a firewall router before they can enter the LAN and the user's computer. The e-mail service is provided using, among other devices, the firewall and an e-mail server.

Step 101 in FIG. 1 consists of an xAuthority core server sending two service drivers to a "policy distribution point" (PDP). One service driver is used to configure the firewall, and the other is used to configure the e-mail server. The core server retrieves these service drivers from its service driver library.

In this first embodiment, the PDP is a computing element that facilitates communication between the xAuthority core server and the devices to be configured. The software on the PDP is not a single monolithic piece of software code, but rather includes modular pieces of software, including one or more service drivers and a service driver infrastructure portion. The service driver infrastructure portion and the service drivers interact using a predefined standard interface. This standard interface allows the two service drivers to be added to the PDP while the PDP is running and without disrupting the operation of already-installed service drivers. (For more information on PDPs including their structure and operation, see provisional application Ser. No. 60/354,268, pp. 18, 39, 85, 123 and 351).

In step 102, a configurable input engine of the xAuthority core server generates "activations" in the form of XML documents and sends them to the PDP. (For additional information on a configurable input engine and on a service creation process in general, see: U.S. patent application Ser. No. 10/213,043, entitled "System and Method For Setting Up User Self-Activating Network-Based Services", by Bellinger et al., filed Aug. 5, 2002, now U.S. Pat. No. 7,024,470.

The activations contain configuration parameters and other information used to configure the e-mail server and the firewall to set up the e-mail service for the user. The activations are received by the PDP in step 103. In step 104, the service drivers that have already been installed on the PDP translate the activations into formats and instructions that the e-mail server and the firewall can understand. In step 105, the PDP then sends the device-specific instructions to the e-mail server and firewall. The instructions configure those devices to set up e-mail service for the user in step 106. The PDP also sends responses in the form of XML messages back to the core server indicating whether actions requested in activations have succeeded or failed.

Figure 2:
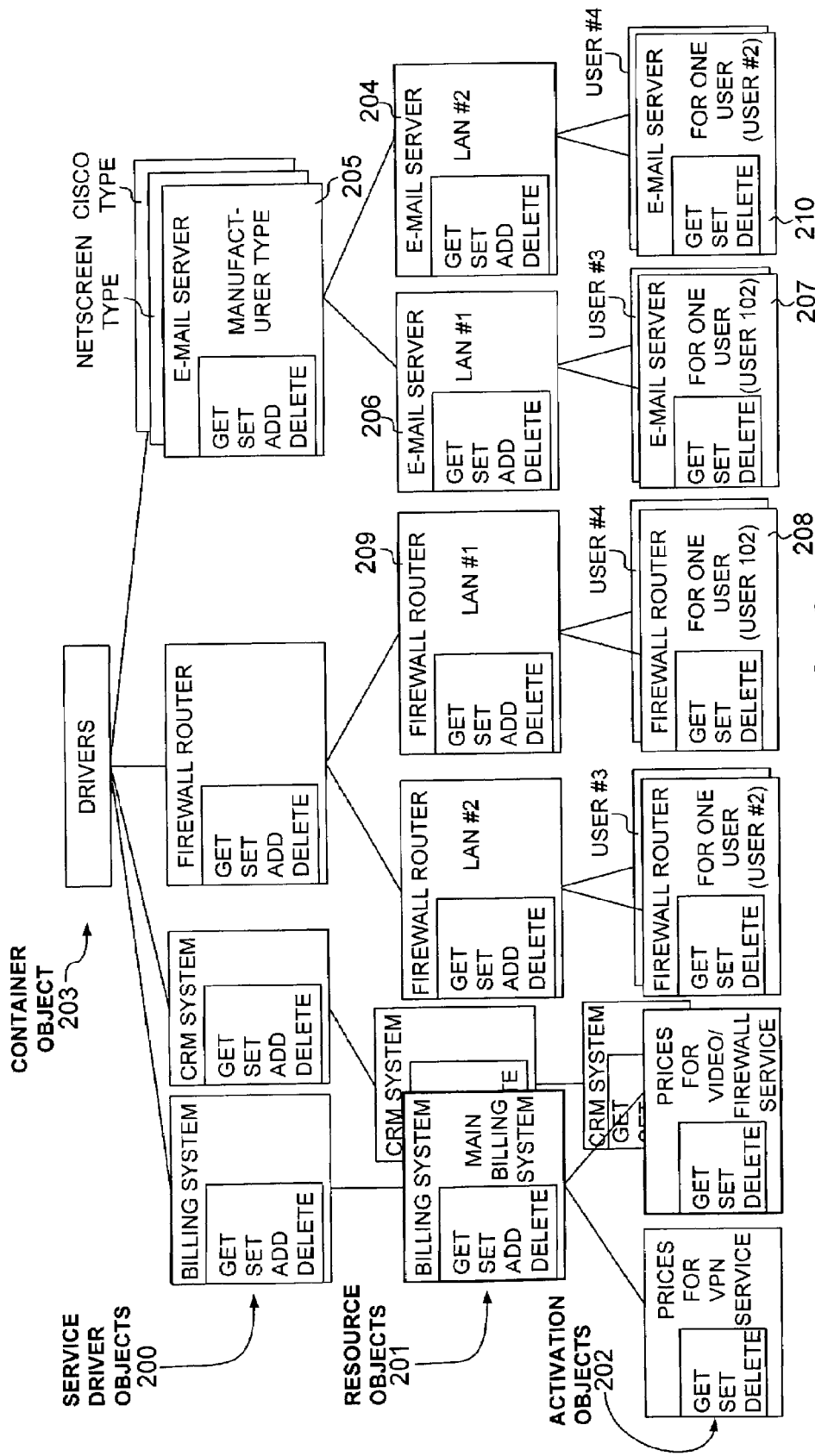
FIG. 2 is a diagram of a service driver tree. The diagram sets forth a relationship between various service driver components used in accordance with one embodiment of the system.

Software Components Of First Embodiment:

FIG. 2 shows three aspects of service drivers: service driver objects 200, resource objects 201 and activation objects 202. (For more information on objects, see provisional application serial No. 60/354,268, p. 160). Service drivers are pre-configured in the core server before the service drivers are sent to PDPs. Each service driver object 200 is accessed through a container object 203. For the e-mail service in this embodiment, an e-mail server driver object 205, as well as an associated resource object 206 (a child object) for the particular e-mail server computing device used to provide service to the user, are configured using the configurable input engine that is part of the xAuthority core server. The input engine configures resource object 206 by adding the IP address of the specific e-mail server. An activation object 207 is automatically created by the input engine when the input engine is run.

In addition to having a library of service drivers, the xAuthority core server also has a library of policy solvers. Policy solvers are formatting programs that determine special formatting requirements that specific device types require for information used to configure them. Policy solvers query service driver objects for each device type in order to compile the formatting requirements. For example, a specific e-mail server may require three configuration parameters in a specific order, whereas a specific firewall router may require a different number of attributes in another specific order. The policy solvers ensure that the activations contain the required information from the configuration parameters in the correct order and form.

Individual service driver objects and resource objects need be created and configured only once. Thereafter, they are stored in the library of service drivers, from which they are retrieved and installed on the appropriate PDP. Alternatively, service drivers that have already been installed on a PDP can be reused and need not be added to the PDP a second time. For example, if resource object 206 for the e-mail server already exists in the service driver library and is correctly configured, then it does not need to be recreated by a system administrator of the ISP or public telephone carrier. Moreover, if service driver object 205 is already present on the PDP, then it does not need to be added a second time.

In the embodiment of FIG. 1, the service drivers on the PDP use implementation formats, such as shared-object and script formats. In a shared-object service driver, the shared-object source code determines how service driver components (activation objects 202, resource objects 201, service driver objects 200) perform the actions defined by the input engine. In a script-based service driver, each service driver component has an associated script that performs the actions associated with that component.

In the embodiment of FIG. 1, the input engine can configure service driver components using four actions: GET, SET, ADD and DELETE. By executing the ADD action on an object, another object can be added below that object. An object can be deleted by executing the DELETE action on the object itself. Activation objects have no ADD action because no child object can be linked below an activation object. The ADD action can also be applied to a service driver object to install the service driver object on a PDP.

The same service driver object is used with resource objects and activation objects added below that service driver object, for example when the same type of service is offered to two different users through two devices of the same type. When a second user is added in the embodiment of FIG. 1, the same service driver object 205 is used together with resource objects 206 and 204 to configure two distinct e-mail servers of the same type, the first connected to the computer of the existing user and the second connected to the computer of the second user. Service driver object 205 also uses information contained in activation objects 207 and 210 to configure the two e-mail servers to provide service to the existing user and the second user, respectively. (For more information on actions (also called operations), see provisional application Ser. No. 60/354,268, pp. 158, 172).

More Detailed Description:

The method of configuring devices to set up a network-based service shown in the flowchart in FIG. 1 will now be described in more detail by referring to a second embodiment of the method of FIG. 1. This more detailed description is described in connection with system 300 in FIG. 3.

Figure 3:
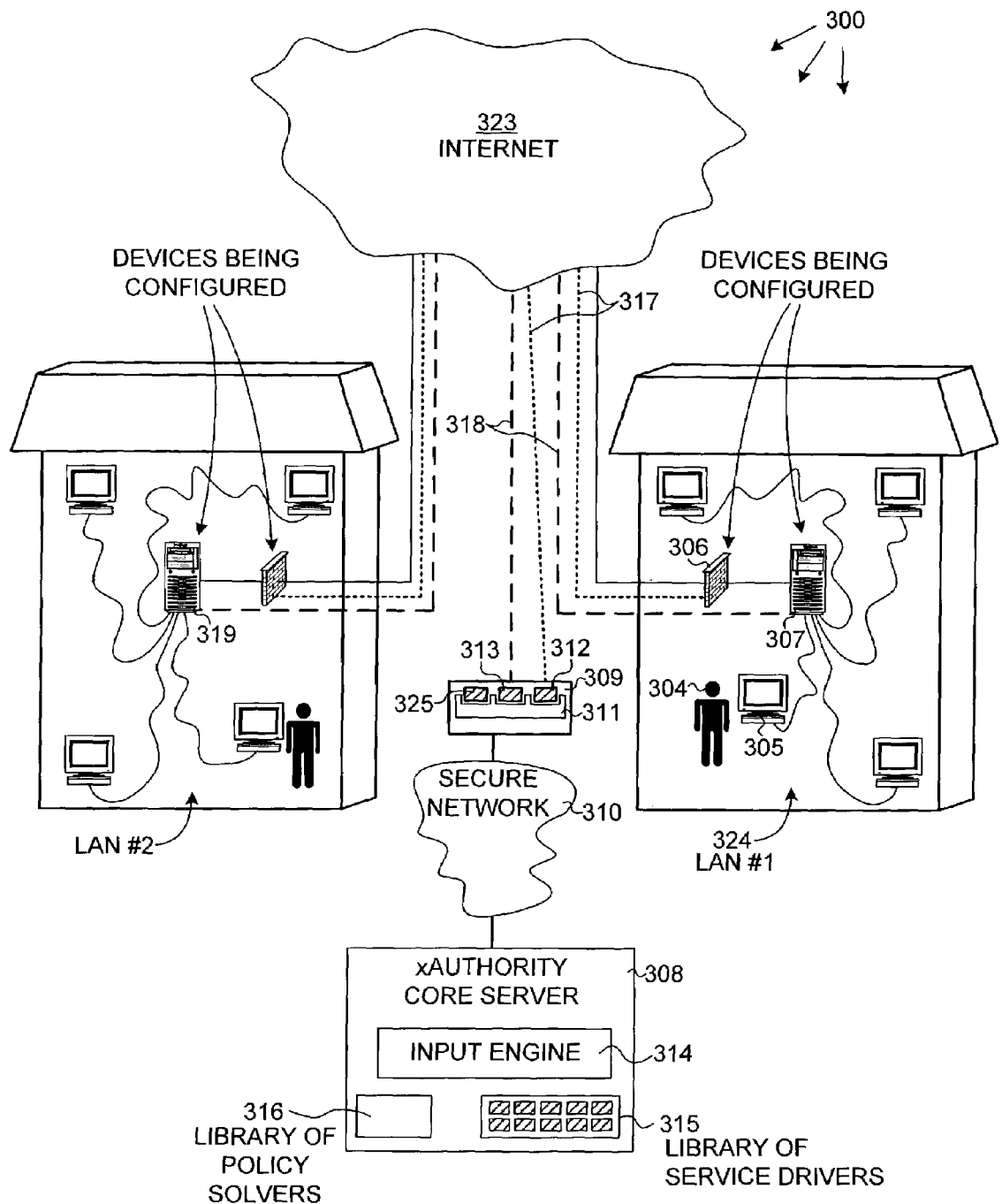
FIG. 3 is a simplified diagram of a system for setting up network-based services in accordance with an embodiment of the present invention that contains a PDP connected to a core server via a secure network.

In FIG. 3, an ISP provides a user 304 with access to e-mail that is protected by a firewall. The e-mail service is provided using, among other devices, a firewall router 306 and an e-mail server 307. In system 300, the e-mail server 307 is integrated into a LAN server that runs a local area network (LAN) 324. User 304 reads e-mails on his computer 305, which is located on LAN 324. E-mails enter LAN 324 from internet 323 through the firewall router 306.

To set up the e-mail service for user 304, the ISP configures the firewall 306 and the e-mail server 307 using an xAuthority core server 308 and a "policy distribution point" (PDP) 309. In this second embodiment, PDP 309 is a computing element that facilitates communication between xAuthority core server 308 and the devices to be configured.

In this specific example of step 101 of FIG. 1, two service drivers are added to PDP 309 without shutting down the network management system of PDP 309. A separate service driver is used for each type of device that is used to deliver a network-based service. In this second embodiment, a first service driver 312 is used to configure the firewall router 306, and a second service driver 313 is used to configure e-mail server 307.

Each of service drivers 312 and 313 has two main components. First, it contains information about the characteristics of the devices it manages and the relationship between those devices. Second, it contains source code (shared-object or script) that defines how the actions ADD, DELETE, GET and SET are to be performed on the devices to be configured.

These two service drivers 312 and 313 are installed by coupling them to a predefined standard interface 401 on the service driver infrastructure portion 311. This standard interface 401 is an application programming interface (API) that facilitates the adding of service drivers 312 and 313 to PDP 309 while PDP 309 is running and without disrupting the operation of service drivers that have already been installed, for example a service driver 325 for a VPN server. Service drivers 312 and 213 are installed without having to shut down PDP 309, thereby avoiding the need to reboot the PDP.

Figure 4:
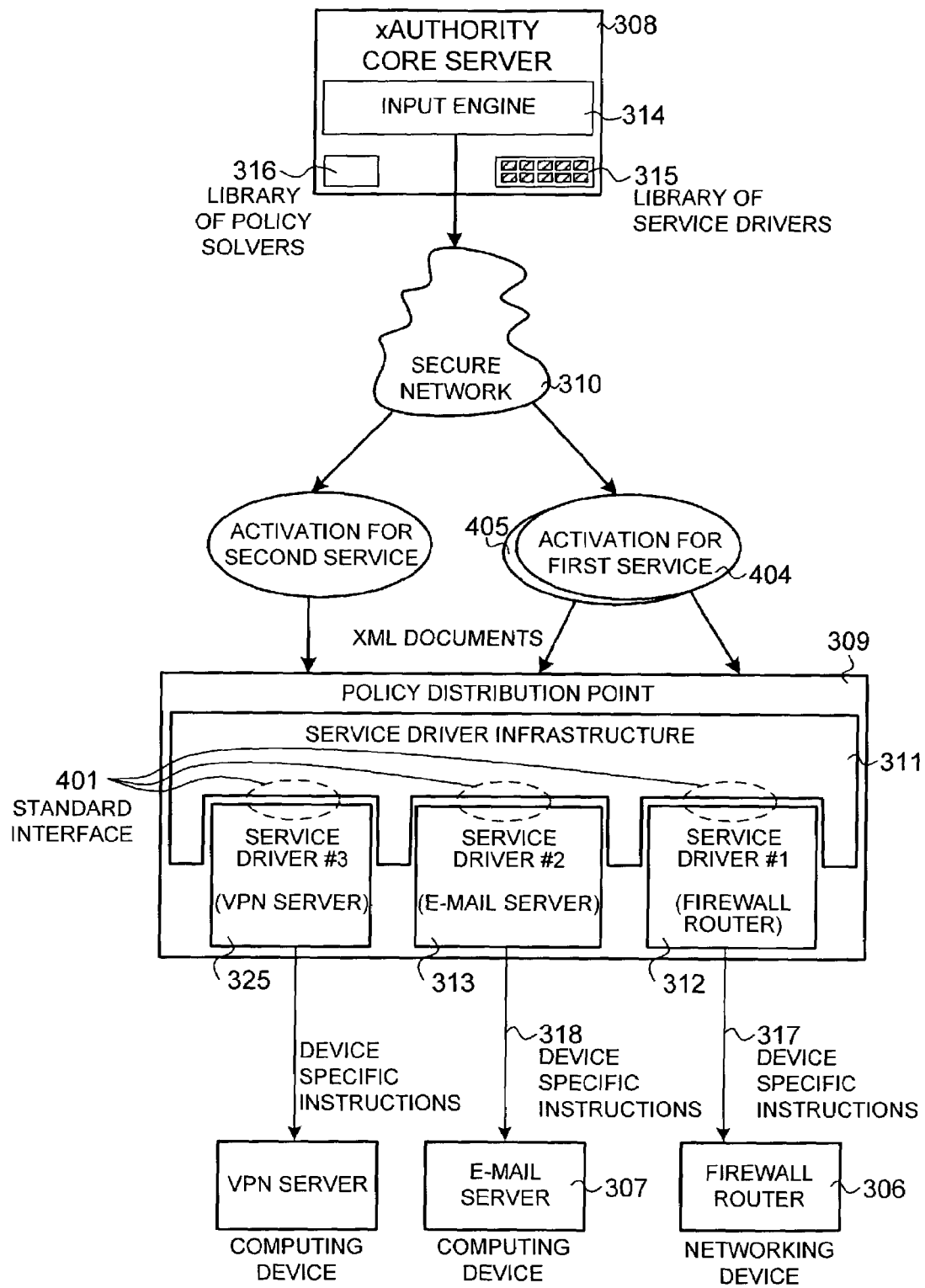
FIG. 4 is a diagram showing how activations travel from a core server to the devices that are configured.

FIG. 4 is a more detailed diagram of PDP 309. PDP 309 includes service driver infrastructure portion 311 and service drivers 312, 313 and 325. (Numerals 200–299 refer to components in FIG. 2; numerals 300–399 refer to components in FIG. 3, which may also be referenced in FIG. 4; other components in FIG. 4 are labeled with numerals 400–499).

In step 102 in FIG. 1, activations are generated by configurable input engine 314 (see FIG. 3) of core server 308. In this embodiment, each of activations 404 and 405 includes both a configuration parameter related to the network-based service (e-mail access), as well as another configuration parameter related to user 304. Activation 404 contains a configuration parameter related to providing the service through firewall router 306. Activation 405 contains a configuration parameter related to providing the service on e-mail server 307. Some examples of configuration parameters that relate to the e-mail service are: quality of service, access mechanism, IP address of firewall, IP address of e-mail server, location of e-mail server, physical port used on e-mail server, connection speed and bandwidth required. Some examples of configuration parameters that relate user 304 are: username of user 304, password of user 304, and the IP address of computer 305 of user 304. In another embodiment, an activation can also include a commercial term in addition to configuration parameters. Some examples of commercial terms are: how much to pay, payment method, duration of service and frequency of payment.

The information in an activation, including the information in the configuration parameters, is formatted as an activation object that is an XML document. An activation contains the information used to configure a specific device for a specific service for one user. Where a service for one user requires more than one device, more than one activation is generated.

In step 103, PDP 309 receives activations 404 and 405 from xAuthority core server 308 in the form of XML over HTTP via secure network 310. Secure network 310 may, for example, be maintained by the ISP. PDP 309 also sends responses in the form of XML messages back to core server 308 indicating whether actions requested in activations 404 and 405 have succeeded or failed.

Each activation is routed within PDP 309 to the appropriate service driver, which was pre-configured in the input engine to be the activation's associated parent object. Here, service driver 313 translates configuration parameters in activation object 207 relating to user 304 and the particular e-mail server 307 in LAN 324 that will be used to provide service to user 304. Service driver 312 translates information in activation object 208 related to firewall 306.

A service driver object is also created for each operational support system (OSS) that the e-mail service uses. For example, service driver objects 200 can be created to interface with billing systems and customer relationship management (CRM) systems.

In step 104, while the software executing on PDP 309 is still running, the service drivers 312 and 313 added in step 101 translate activations 404 and 405 from XML into machine-readable, device-specific instructions. Activation 404 is translated into device-specific instructions 317 written in HTML suitable for configuring firewall router 306. Activation 405 is translated into device-specific instructions 318 written in Lightweight Directory Access Protocol (LDAP) suitable for configuring e-mail server 307.

In step 105, as shown in FIG. 3, the device-specific instructions 317 and 318 are sent from PDP 309, through internet 323, to firewall router 306 (a networking device) and e-mail server 307 (a computing device), respectively.

In step 106, the e-mail service is set up when the device-specific instructions 317 and 318 configure e-mail server 307 and firewall 306. The e-mail server 307 is configured to set up an e-mail account individualized for user 304. The firewall router 306 is configured to allow e-mails relating to the e-mail service to pass through the firewall router to the e-mail server 307.

PDP 309 is placed in close physical proximity to e-mail server 307 and firewall router 306 in order to limit the exposure of the device-specific instructions to non-secure network paths as they travel from PDP 309 to e-mail server 307 and firewall 306. In the second embodiment, activation 405 contains sensitive information, e.g., username and password of user 304, which is translated into device-specific instructions 318. In FIG. 3, device-specific instructions 318 are exposed to non-secure networks as they travel over the internet 323 between PDP 309 and e-mail server 307. PDP 309 is therefore located in close physical proximity to LAN 324 to limit the exposure of device-specific instructions 318 to non-secure networks.

Activations 404 and 405 sent from core server 308 to PDP 309, on the other hand, travel over secure network 310. Where there is no secure network between core server 308 and a PDP, activations in XML can be sent over HTTP encrypted with secure socket layer (SSL) to the PDP in order to improve security.

Figure 5:
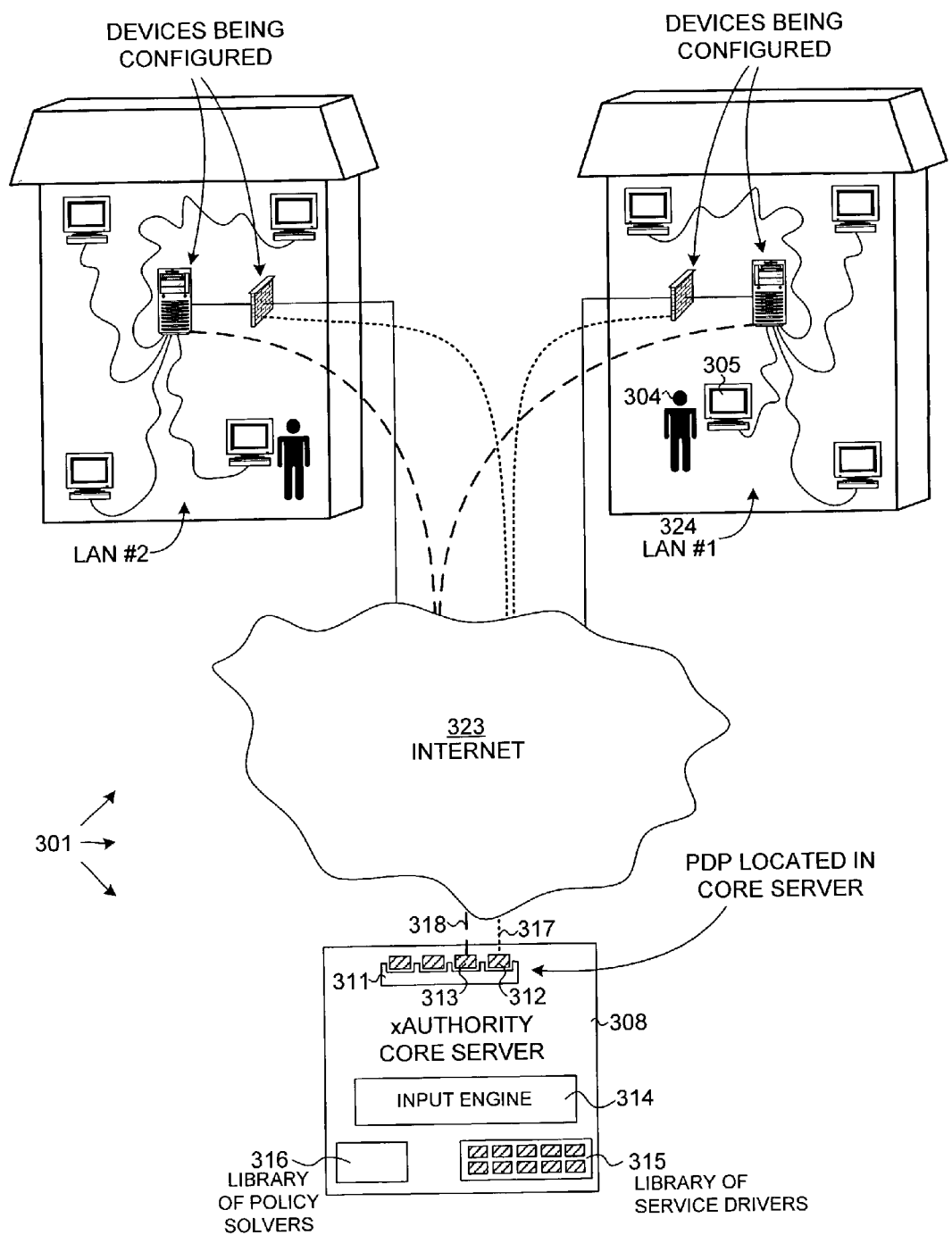
FIG. 5 is a simplified diagram of a system for setting up network-based services in accordance with another embodiment of the present invention that contains a PDP within a core server.

FIG. 5 shows how a PDP can also be located within the xAuthority core server 308. FIG. 5 is a diagram of a system 301 in accordance with a third embodiment, in which device-specific instructions have a higher exposure to the non-secure internet network than do the device-specific instructions in FIG. 3. To improve security, the device-specific instructions 317 and 318 in FIG. 5 are sent by core server 308 over HTTP encrypted with SSL to the devices that they configure. In the embodiment shown in FIG. 5, the information contained in the activations 404 and 405 is transferred within core server 308 from the input engine 314, the library of service drivers 315 and the library of policy solvers 316 to the service driver infrastructure 311. This information is then included in device-specific instructions by service drivers 112 and 113.

Figure 6:
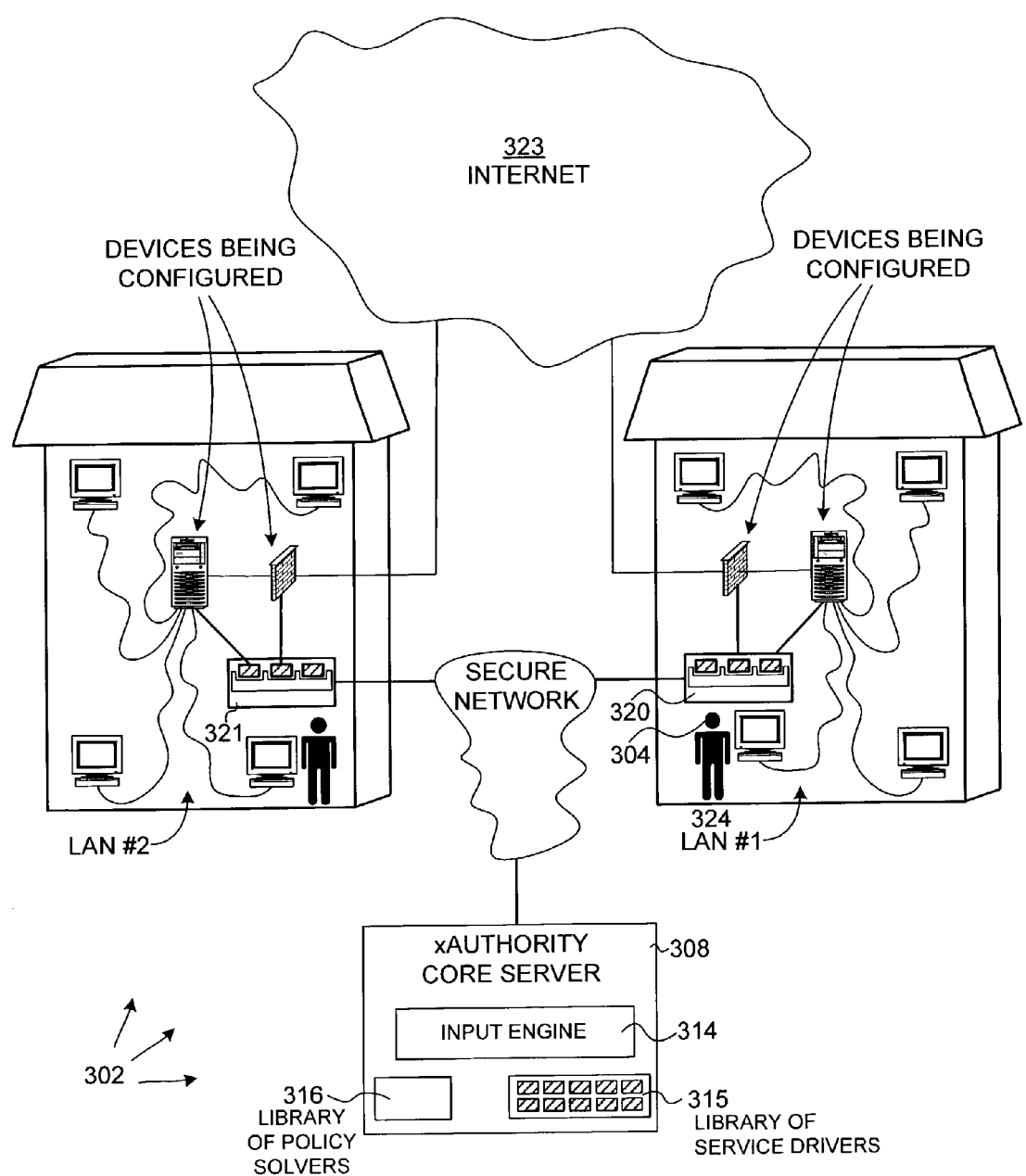
FIG. 6 is a simplified diagram of a system for setting up network-based services in accordance with another embodiment of the present invention, in which PDPs are remotely located within LAN networks.

FIG. 6 shows how PDPs can alternatively reside on dedicated servers and be installed locally at or near user sites to manage local networking resources and/or computing resources. FIG. 6 is a diagram of a system 302 in accordance with a fourth embodiment, in which the PDPs 320 and 321 are located within local area networks. The PDPs 320 and 321 are connected to core server 308 by a secure network. Therefore, neither activations, nor device-specific instructions are exposed to non-secure networks in FIG. 6. In FIG. 6, activations related to devices on LAN #1 (324) are sent to PDP 320, whereas activations related to devices on LAN #2 are sent to PDP 321.

Figure 7:
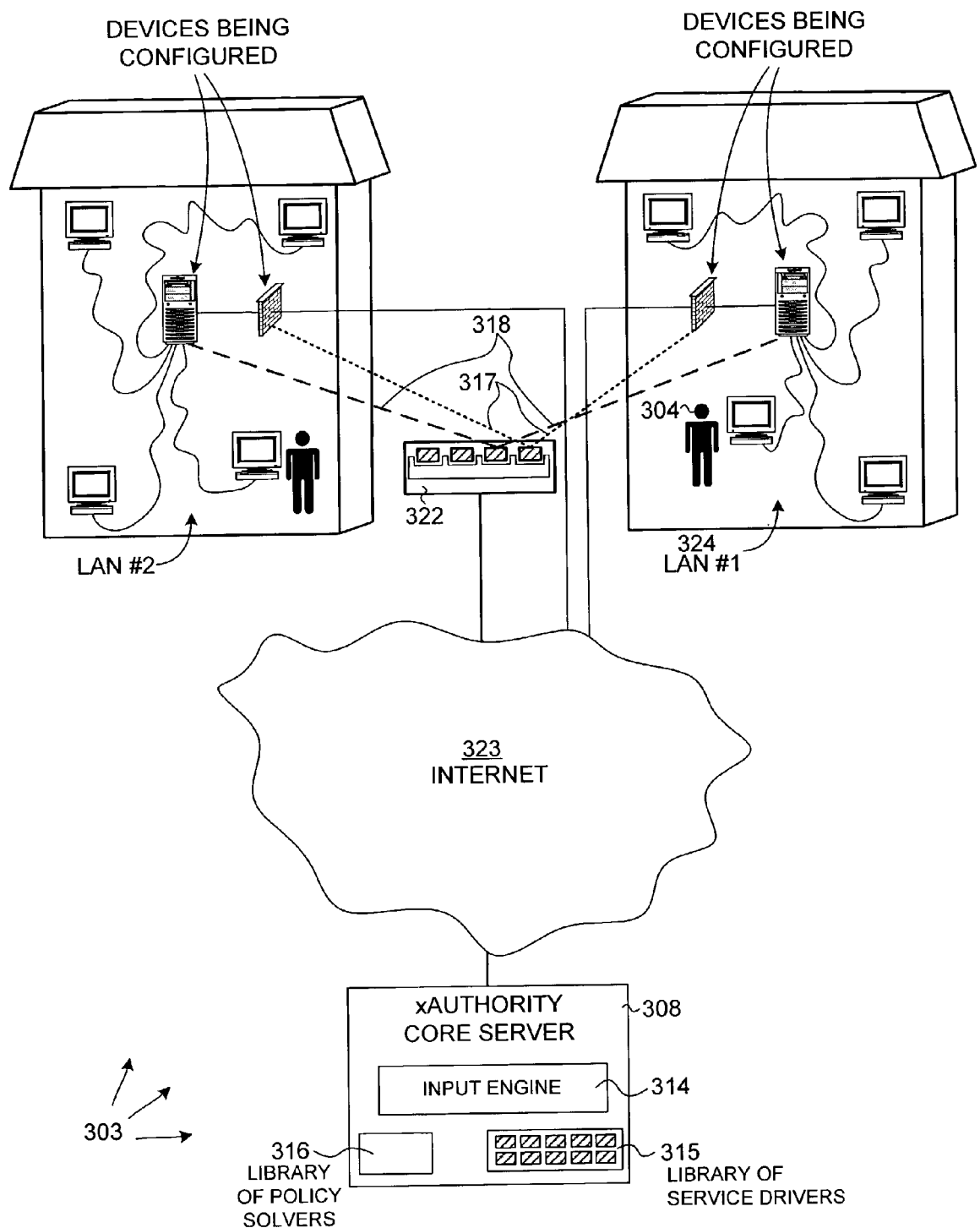
FIG. 7 is a simplified diagram of a system for setting up network-based services in accordance with another embodiment of the present invention that contains a PDP connected to a core server via the internet.

FIG. 7 is a diagram of a system 303 in accordance with a fifth embodiment. In FIG. 7, PDP 322 is coupled directly to the devices that are to be configured to set up a network-based service. Device-specific instructions 317 and 318 emanating from PDP 322 are not exposed to non-secure networks.

In a sixth embodiment (not shown), PDPs reside within the devices that they manage. Separate activations are sent to each device used to provide a service to one user. An additional set of activations is then sent to each device when the service is set up for an additional user.

Figure 8:
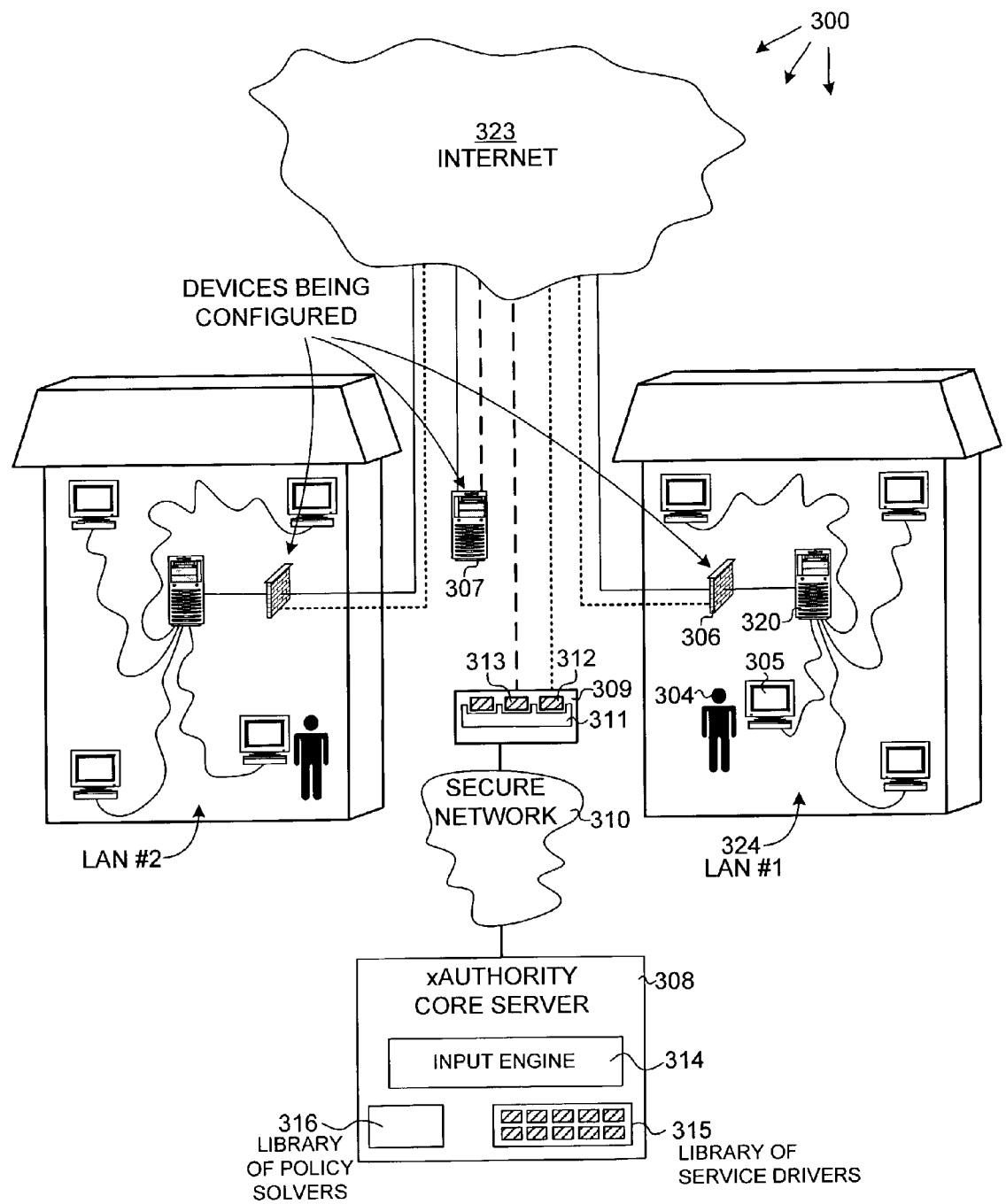
FIG. 8 is a simplified diagram of the system in FIG. 3, wherein a computing device and a networking device to be configured are not part of the same local area network.

FIG. 8 shows another example of the embodiment shown in FIG. 3. In this example, e-mail server 307 is outside LAN 324 as would be the case if an application service provider (ASP) provided access to a Microsoft Exchange server. A LAN server 320 runs LAN 324, which is separated from the internet 323 by firewall router 306. The computing device (e-mail server 307) and the networking device (firewall router 306) that are to be configured are not part of the same local area network.

Figure 9:
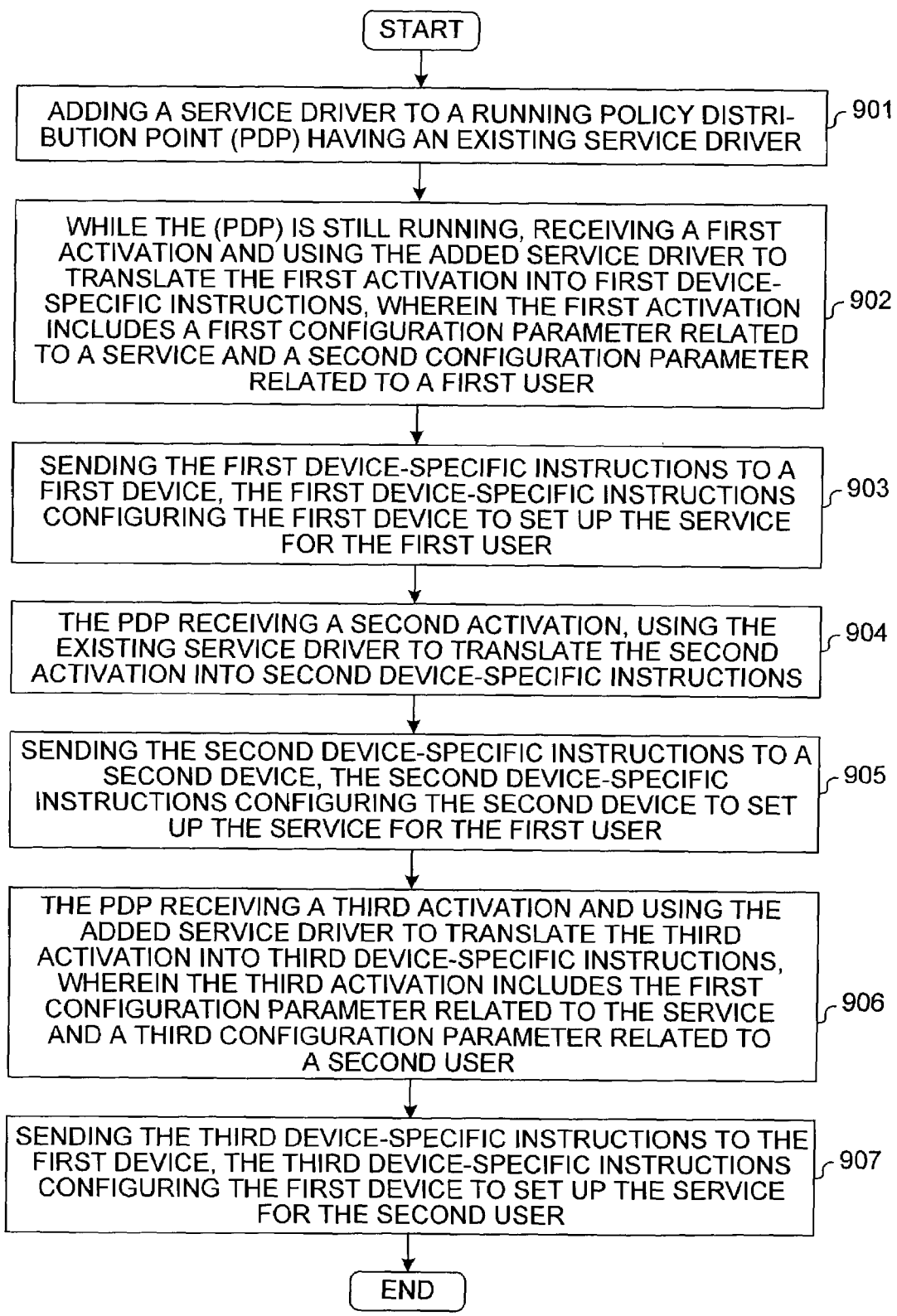
FIG. 9 is a flowchart of a method in accordance with another embodiment of the present invention.

FIG. 9 is a flowchart of a method in accordance with another embodiment. In this embodiment, a service driver is added to a running PDP (step 901). A first activation for a first device and a second activation for a second device configure multiple devices to set up a service for a first user (steps 902–905). One of the activations is translated by the added service driver, whereas the other activation is translated by a previously existing service driver. The method of FIG. 9 further illustrates a third activation that uses the added service to configure the first device to provide the service to a second user (steps 906–907). FIG. 9 is provided to illustrate that a system in accordance with certain embodiments can be used to configure multiple devices using multiple service drivers to provide a service to multiple users. Both previously existing as well as added service drivers are used.

Compact Disc Appendix

The Compact Disc contains:

A) a directory file AMP, 1.08 MB, written to disc 08/19/02; AMP contains 281 files that relate to the configuration of an xAuthority core server. For example, the file ampConfig.pl (83 KB, written to disc on Aug. 19, 2002) in the directory file AMP\bin covers how GET and SET actions are performed.

B) a directory file PORTAL, 2.71 MB, written to disc Aug. 19, 2002; PORTAL contains 855 files. The files in directory PORTAL relate to interfaces to an xAuthority core server.

C) a directory file XLINK, 1.77 MB, written to disc Aug. 19, 2002; XLINK contains 503 files. The files in directory XLINK relate to the main logic of the functioning of an input engine of an xAuthority core server. For example, the directory file XLINK\XLINK\Workflow (58.9 KB, written to disc on Aug. 19, 2002) in the directory file XLINK\XLINK contains the main files for implementing the actions ADD, DELETE, GET and SET.

D) a file CD Appendix Title Page.txt, 373 bytes, written to disc Aug. 19, 2002.

The term policy is not used in this patent document (and in the claims of this document) in the way the term policy was used in provisional application Ser. No. 60/354,268. Sometimes the term "service driver module" is used to refer to a service driver that has been configured and installed on a PDP. Remote installation of a service driver is similar to local installation of a service driver, except that the dynamic library (shared object library) that constitutes the service driver is serialized (base-64 encoded) and sent over the HTTP protocol to the PDP. Because the service driver is a shared object, it is dynamically linked by the Solaris operating system of the PDP at run time without restarting the PDP.

Although the present invention has been described in connection with certain specific embodiments (for example, as set forth in the provisional application Ser. No. 60/354,268 that is incorporated by reference) for instructional purposes, the present invention is not limited thereto. A PDP can be a stand-alone device or, alternatively, a PDP can be software disposed within a separate hardware device, such as, for example, a core server. Accordingly, various modifications, adaptations, and combinations of various features of the described embodiments can be practiced without departing from the scope of the invention as set forth in the claims.

What is claimed is:

1. A method comprising:
   (a) adding a service driver to a running policy distribution point; and
   (b) while the policy distribution point is still running, receiving a first activation and using the added service driver to translate the first activation into first device-specific instructions, wherein the first activation includes both a first configuration parameter related to a network-based service and a second configuration parameter related to a first user.

2. The method of claim 1, wherein the first configuration parameter related to a network-based service is taken from the group consisting of: a quality of service, an access mechanism, a device IP address, a device location, a physical port, a connection speed and a bandwidth required.

3. The method of claim 1, wherein the second configuration parameter related to a first user is taken from the group consisting of: a username, a password and an IP address of a computer used by the first user.

4. The method of claim 1, wherein the running policy distribution point contains an existing service driver, the method further comprising:
   (c) sending the first device-specific instructions to a first device, the first device-specific instructions configuring the first device to set up the network-based service;
   (d) using the existing service driver to translate a second activation into second device-specific instructions; and
   (e) sending the second device-specific instructions to a second device, the second device-specific instructions configuring the second device to set up the network-based service, wherein both the first device and the second device are used to provide the network-based service to the first user.

5. The method of claim 1, further comprising:
   (c) sending the first device-specific instructions to a device, the first device-specific instructions configuring the device to set up the network-based service.

6. The method of claim 5, wherein the first device-specific instructions are sent from the policy distribution point to the device without passing over the internet.

7. The method of claim 5, wherein the device is a computing device.

8. The method of claim 5, wherein the device is a networking device.

9. The method of claim 8, the method further comprising:
   (d) adding a second service driver to a running policy distribution point;
   (e) while the policy distribution point is still running, receiving a second activation and using the second service driver to translate the second activation into second device-specific instructions; and
   (f) sending the second device-specific instructions to a computing device, wherein both the networking device and the computing device are configured to set up the network-based service.

10. The method of claim 1, wherein the policy distribution point has a predefined interface for service drivers, the predefined interface facilitating installation of the added service driver into the policy distribution point at run time while the policy distribution point is running.

11. The method of claim 10, wherein the policy distribution point is not a monolithic policy distribution point, but rather is a modular policy distribution point comprising a service driver infrastructure portion and one or more service drivers.

12. The method of claim 10, wherein the first activation is translated by the added service driver from XML into the first device-specific instructions.

13. A method comprising:
(a) adding a service driver to a running policy distribution point;
(b) while the policy distribution point is still running, receiving a first activation and using the added service driver to translate the first activation into first device-specific instructions, wherein the first activation includes both a first configuration parameter related to a network-based service and a second configuration parameter related to a first user;
(c) sending the first device-specific instructions to a device, the first device-specific instructions configuring the device to set up the network-based service for the first user;
(d) while the policy distribution point is still running, receiving a second activation and using the added service driver to translate the second activation into second device-specific instructions, wherein the second activation includes both the first configuration parameter related to the network-based service and a third configuration parameter related to a second user; and
(e) sending the second device-specific instructions to the device, the second device-specific instructions configuring the device to set up the network-based service for the second user.

14. A computer-readable medium having computer-executable instructions for performing steps comprising:
(a) adding a service driver to a running policy distribution point; and
(b) while the policy distribution point is still running, receiving an activation and using the added service driver to translate the activation into device-specific instructions, wherein the activation includes both a first configuration parameter related to a network-based service and a second configuration parameter related to a first user.

15. The computer-readable medium of claim 14 having further computer-executable instructions for performing the step of:
(c) sending the device-specific instructions to a device, the device-specific instructions configuring the device to set up the network-based service.

16. A method for setting up a service, the method comprising:
(a) receiving a first configuration parameter related to providing a network-based service on a device;
(b) receiving a second configuration parameter related to a first user;
(c) generating a first activation, the first activation including information from the first configuration parameter as well as information from the second configuration parameter;
(d) sending the first activation to a policy distribution point such that a service driver installed on the policy distribution point translates the first activation into first device-specific instructions; and
(e) sending the first device-specific instructions from the policy distribution point to the device such that the first device-specific instructions configure the device to set up the service for the first user.

17. The method of claim 16, further comprising:
(f) receiving a third configuration parameter related to a second user;
(g) generating a second activation, the second activation including information from the first configuration parameter as well as information from the third configuration parameter relating to the second user;
(h) sending the second activation to the policy distribution point, the service driver translating the second activation into second device-specific instructions; and
(i) sending the second device-specific instructions from the policy distribution point to the device such that the second device-specific instructions configure the device to set up the service for the second user.

18. A system for setting up a network-based service, the network-based service involving a device, the system comprising:
a policy distribution point comprising a service driver infrastructure and a service driver, the service driver being adapted for communication with the device; and
a core server that generates an activation associated with the service, the activation being sent to the policy distribution point and passing through the service driver infrastructure to the service driver, the activation being translated by the service driver into instructions that are sent from the policy distribution point to the device, the instructions configuring the device to set up the network-based service.

19. The system of claim 18, wherein the core server sends the service driver to the policy distribution point, the service driver being installed on the policy distribution point at run time without rebooting the policy distribution point.

20. The system of claim 19, wherein the network-based service also involves a second device, the core server generating a second activation associated with the service, the system comprising a second policy distribution point, the second activation being sent from the core server to the second policy distribution point, a service driver in the second policy distribution point translating the second activation into second device-specific instructions, the second device-specific instruction being sent from the second policy distribution point to the second device such that the second device is configured to set up the network-based service.

* * * * *